March 7, 1939.  C. G. OLSON  2,149,359
LOCK NUT
Filed Nov. 25, 1936  2 Sheets-Sheet 2
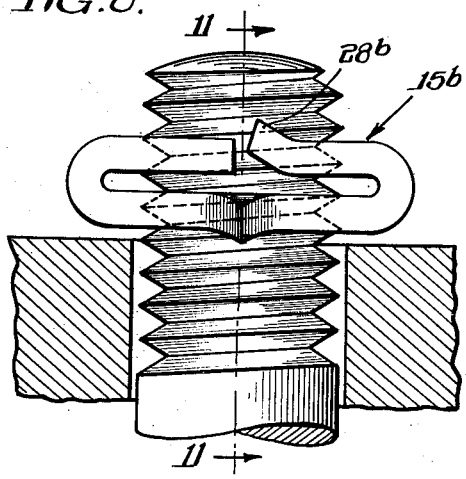
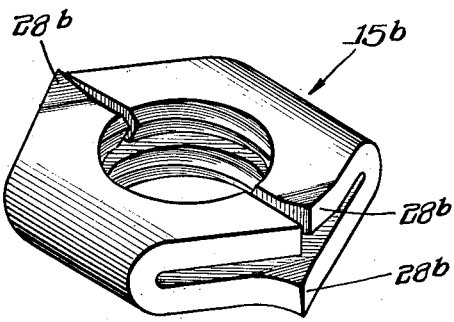
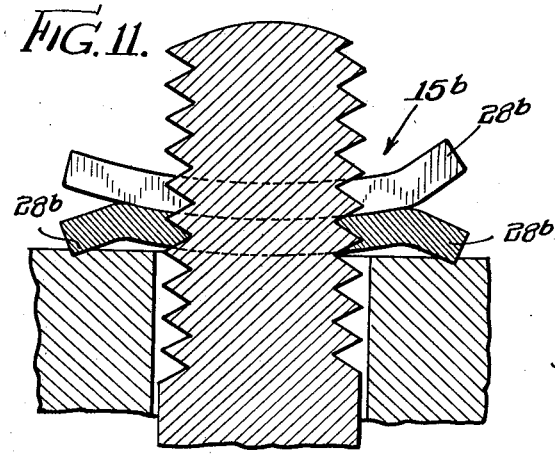
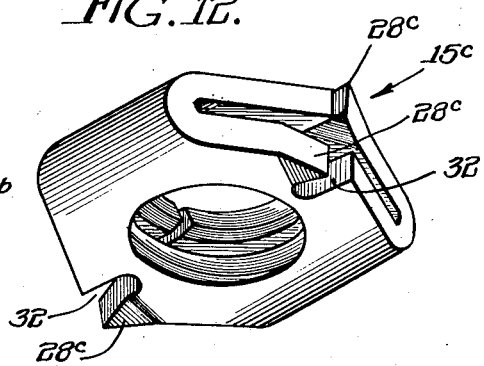
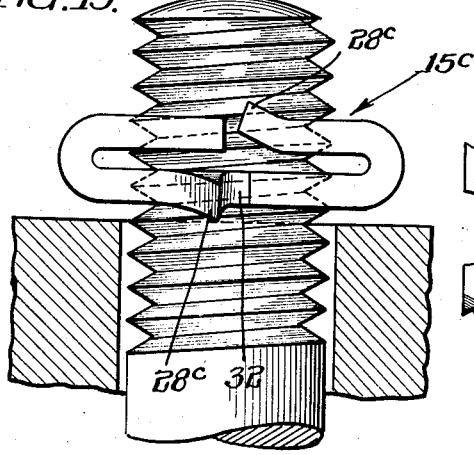
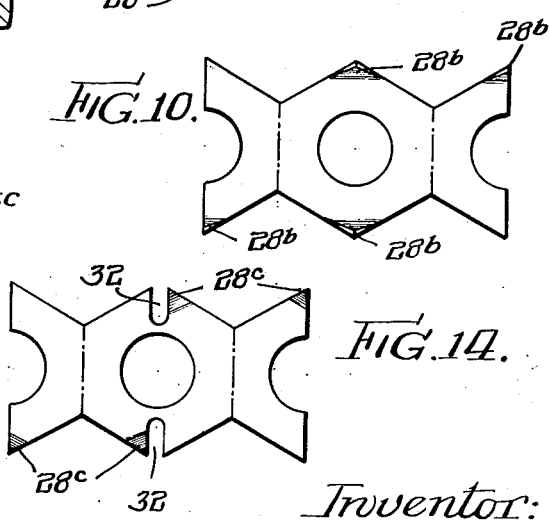
Inventor:
Carl G. Olson
By: Cox & Moore attys.

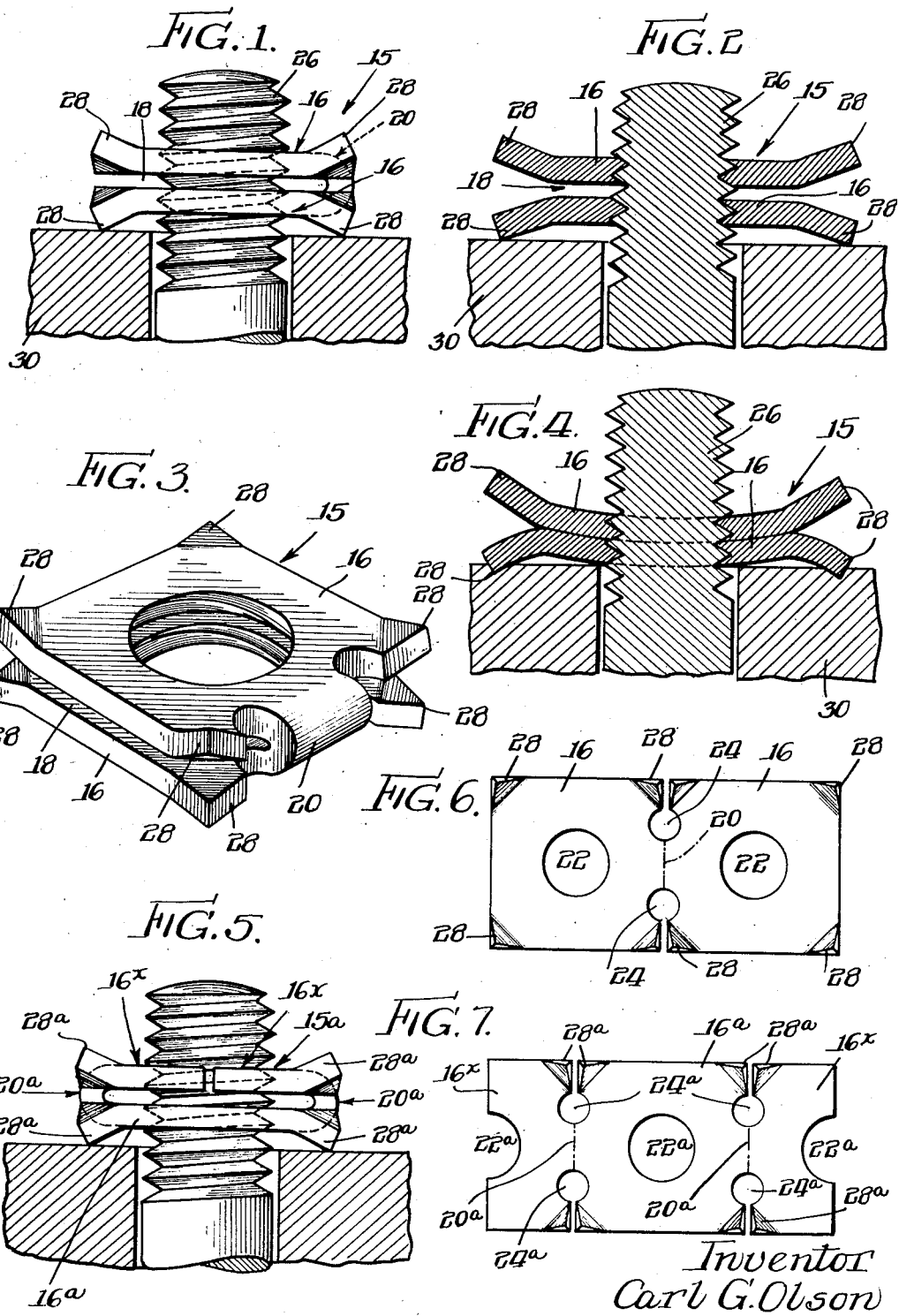

Patented Mar. 7, 1939

2,149,359

UNITED STATES PATENT OFFICE 2,149,359

LOCK NUT

Carl G. Olson, Chicago, Ill., assignor to Illinois Tool Works, Chicago, Ill., a corporation of Illinois Application November 25, 1936, Serial No. 112,721

8 Claims. (Cl. 151—37)

This invention relates generally to locking devices, and more particularly to locking devices of the internally threaded type adapted to be applied to a threaded shank similar to a conventional nut.

Experience has shown that when conventional nuts, particularly of the smaller sizes, are used without auxiliary locking devices such as lock washers, difficulty has been experienced in preventing the loosening of such nuts due to vibration. As an example of such difficulties, I refer to the small size conventional nuts used for stove bolts and the like. Stove manufacturers find that during the period of shipment their products often experience severe vibration and shock. Not infrequently when transported stoves reach their destination, bolts and nuts have loosened and fallen to the floor of the freight car.

It is the primary object of the present invention to obviate the above mentioned and other similar inconveniences and difficulties by providing a locking device or nut of extremely simple and economical design which will lock itself against the work surface and thread shank of the screw when tightened by the application of normal tightening forces.

More specifically, my invention contemplates a simple and economically constructed lock nut as set forth above which may be produced from a single strip of flexible metal as distinguished from the solid, non-rigid conventional nuts.

It is a further object of the invention to provide a lock nut of the type referred to above which is adapted to yield when tightened against a work piece whereby to enhance the locking characteristics thereof.

Still more specifically, my invention contemplates a spring type or resilient lock nut as set forth above which is adapted to dig into the work when tightened thereagainst so as to vigorously oppose retrograde rotation, and the invention also contemplates resilient nuts of this type, either side of which may be applied to a threaded shank or bolt.

The foregoing and numerous other objects and advantages will be more apparent from the following detailed description when considered in connection with the accompanying drawings, wherein Figure 1 is a side elevational view of a resilient lock nut constructed in accordance with the teachings of the present invention, said nut being shown in association with a threaded shank and work piece;

Figure 2 is a view showing the resilient nut of Figure 1 in vertical cross section;

Figure 3 is a perspective view of the nut shown in Figures 1 and 2;

Figure 4 discloses the nut of Figures 1 to 3, inclusive, after it has been tightened against the work;

Figure 5 discloses a slightly modified resilient nut in operative association with a threaded bolt and work piece;

Figure 6 is a plan view of the blank of resilient stock which is bent and flexed so as to present the nut shown in Figures 1 to 4, inclusive;

Figure 7 discloses the blank from which the resilient nut of Figure 5 is formed;

Figure 8 discloses a still further modified resilient nut construction shown in operative association with a threaded shank and work piece;

Figure 9 is a perspective view of the spring nut shown in Figure 8;

Figure 10 discloses the blank from which the nut of Figures 8 and 9 is produced;

Figure 11 is a central transverse vertical sectional view taken substantially along the line 11—11 of Figure 8, after the nut has been tightened against the work;

Figure 12 is a perspectoive view of the underside of another modification;

Figure 13 is a side elevational view of the nut shown in Figure 12, before it is tightened against the work; and Figure 14 discloses the blank from which the nut shown in Figures 11 and 12 is produced.

Referring now to the drawings more in detail, wherein like numerals have been employed to designate similar parts throughout the various figures, it will be seen that the present invention contemplates a yieldable or resilient locking device or nut designated generally by the numeral 15, Figures 1 to 4, inclusive. This nut 15 comprises identical body portions 16 normally separated by the space 18 and connected to each other at one margin by a neck 20.

Referring to Figure 6, it will be seen that the nut 15 is formed from a substantially rectangular blank of resilient stock. The body portions 16, which are connected by the marginal member or neck 20, are each provided with a threaded aperture 22 disposed centrally of each body portion. The neck 20 is bounded on opposite sides by suitable recesses 24. When the two body portions 16 are folded along the line on marginal neck 20 (see dot-and-dash line, Figure 6), so as to finally assume the position shown in Figures 1 and 2, the threaded apertures 22 are disposed coaxially so as to enable the nut to be applied to a threaded shank 26 from either side of the nut.

I prefer to deflect the corners of each body axially of the nut so as to provide work engaging or locking teeth 28. These teeth or prongs 28 provide sharp corners which are adapted, when the nut is tightened against the work, as shown in Figure 4, to imbed themselves into the surface of a work piece 30. Obviously, the degree to which the corners of the body portions 16 are deflected depends upon the use to which the nut is to be put. Also the degree of hardness of the nut will be determined by the relative hardness of the work piece. In certain instances, it is preferable to temper the resilient stock of the nut so as to enable the teeth 28 to lockingly imbed themselves within the work piece.

Particular attention is directed to the manner in which the above described nut lockingly functions to secure itself against loosening when firmly tightened against the work 30. In Figures 1 and 2, the nut has been shown prior to the tightening thereof against the work. As the tightening of the nut continues, as for example by applying rotation to the threaded shank or bolt 26, the teeth first imbed themselves within the surface of the work. The resistance of the work finally prevents further axial movement of the lower section 16.

Continued rotation of the screw 26 causes the lower nut section of body 16 in the vicinity of the threaded aperture 22 to be drawn toward the adjacent surface of the work piece 30. This lower section 16 becomes dished, or concavo-convex, as clearly shown in Figure 4. During this period of tightening, the teeth or prongs 28 embedded within the work 30 prevent rotation of the nut with respect to the work. The upper section of body portion 16 is also drawn down tight against the lower section 16 with the result that the thread helices within the nut are somewhat distorted or stressed. This continued flexing of the nut body sections 16 and threads, together with the locking of the teeth 28 against the work, produces a very effective nut locking action. The screw shank 26 will not turn because of the gripping action of the nut threads upon the screw threads, and the nut will not rotate or shift with respect to the work because of the effective locking action of the teeth 28.

The above described novel combination of locking elements which cooperate to resist forces tending to loosen the nut has great practical significance. Obviously, the mere fact that the nut itself may be secured against rotative movement with respect to the work piece would not be sufficient to secure the bolt against loosening without the provision of some auxiliary fastening means. Thus, I provide in the simple resilient nut structure means for both securing the nut and screw against retrograde rotation and for securing the nut against loosening with respect to the work. Both of these locking agencies function automatically when the screw and nut are finally driven home.

The practical value of the present invention will probably be more apparent when it is understood that stove bolts and the like are very frequently applied to structures which do not permit manipulation of a wrench or tightening element upon a nut. In other words, the screw is frequently inserted from the outside and the nut must be applied on the inside of the structure in a position which is inaccessible for tightening devices or tools. It is only necessary in the application of a nut such as the above described nut 15 for the user to first freely spin the nut 15 on the screw by hand and then apply a screw-driver to the externally positioned head of the screw. As the teeth 28 of the nut engage the inner surface of the work structure, further relative rotation of the nut with respect to the work is precluded, and hence no wrench or tool is required to enable continued tightening of the screw. As the screw is finally driven home or tightened, the nut body portions 16 are drawn toward each other in the manner described above so as to effect a firm grip between the complementary threads of the nut and bolt. In this position, both the nut and screw are positively secured against loosening with respect to the work, which might otherwise result from vibration or shock.

In Figure 5 I have disclosed a slightly modified nut which is designated generally by the numeral 15a. The nut 15a is structurally similar to the nut 15, but differs therefrom in that two connecting necks 20a are employed instead of the single neck 20 previously described. These neck portions 20a are bounded on opposite sides by recesses 24a and suitable threaded apertures 22a corresponding with the apertures 22 are provided. The nut 15a includes a central body portion 16a which cooperates with half sections 16x. These body portions 16a and 16x are provided with teeth 28a, and the neck portions 20a provide the hinge members to permit folding of the blank so as to present the structure shown in Figure 5.

From the foregoing description it will be apparent that the nut 15a functions similarly to the nut 15 in that during the initial tightening of the nut against the work the teeth become imbedded within the work and upon continued tightening the body portions 16a and 16x are urged toward each other so as to effectively grip the complementary thread helices in the screw, as previously described.

Figures 8 to 11, inclusive, disclose another nut embodiment which I have designated generally by the numeral 15b. This nut 15b is quite similar to the nut 15a in that the body portions are connected by a pair of hinges. The structure 15b, however, differs from 15a in providing a hexagonal nut as distinguished from the square nut 15a. Also a pair of work engaging teeth or prongs 28b are formed by deflecting oppositely disposed corners of the body section. The blank is folded along the dot-and-dash lines, Figure 10, so as to present the nut structure shown in Figures 8 and 9. Figure 11 discloses the nut 15b after it has been finally tightened against the work.

Figures 12 to 14, inclusive, disclose a still further modification, the nut therein being designated generally by the numeral 15c. This hexagonal nut 15c is quite similar to the nut 15b, differing only therefrom in providing radial slits or recesses 32. The corner portions of the body section of the nut 15c are deflected, as shown in Figures 12 to 14, inclusive, so as to provide work engaging ratchet teeth or prongs 28c. This form of ratchet tooth enables the nut to be clamped against the work with a force which is less than that which is required to impart retrograde movement to the nut after it has been tightened against the work.

From the foregoing, it will be apparent that my invention contemplates a simplified, yieldable nut which will spin onto a screw freely like a conventional nut and which, at the same time, is adapted to lock tightly on the screw, as well as against the work in the final tightening of the screw. Also, my invention provides a nut which may be drawn tighter against the work by continued rotation of the screw than is possible by the use of conventional nuts, particularly where the nuts are used in places which do not readily permit the use of a wrench or nut-holdng tool. Obviously, the nuts described herein are not limited for use in stove construction, but have many other practical applications, as, for example, in the radio field. Because of the resilient characteristic of the above described nut bodies or sections, and the provision of axially deflected or projecting locking prongs, said nuts adapt themselves for use on surfaces which may vary in contour. All of the above described nuts have locking teeth or prongs on opposite sides, thereby enabling either side of the nut to be applied to the bolt. This makes it unnecessary for the user to be concerned about the side of the nut which is being applied, and, in these days of high speed production activity, this convenience materially contributes in saving time and effort on the part of the worker.

It will be apparent that my improved nut may be made by practicing simple, conventional, machine shop methods. That is to say, the nuts may be made from a strip or piece of resilient flat stock. It is only necessary to form and tap the apertures for receiving the screw and to punch the holes 24 and 24a in a strip of spring stock. This type of construction lends itself for simple stamping operations and hence enables the production of a very efficiently operative lock nut at a very low cost.

Obviously, the invention is not limited to the specific structural details disclosed and described herein but embraces other structural modifications and embodiments contemplated by the appended claims.

Having thus described my invention, what I claim as new and desire to secure by Letters Patent is:

1. A locking device including an apertured resilient body of relatively thin spring stock, thread follower means on said body in the vicinity of said aperture, said body having marginal portions adapted to be engaged by a conventional turning tool such as a wrench, and locking teeth peripherally positioned upon said body adapted to be embedded within the surface of a work piece when said body is tightened with respect thereto.

2. A locking device including a plurality of oppositely disposed body sections, each of said sections being provided with internal thread follower means disposed in substantial coaxial alignment, at least one of said sections being resilient, and locking means associated with said resilient section for gripping the surface of the work when the device is tightened with respect thereto, said locking means and resilient section being cooperatively disposed to permit axial flexing of said resilient section after said locking means grippingly engages the work.

3. A locking device including an apertured and folded sheet metal resilient body, thread follower means on said body in the vicinity of said aperture, and locking prongs flexed out of the plane of the body to provide work engaging teeth adapted to grip the work when said body is tightened with respect thereto 4. A locking device including a plurality of oppositely disposed body sections, each of said sections being provided with internal thread follower means disposed in substantial coaxial alignment, at least one of said sections being resilient, and corner portions of said resilient section providing teeth adapted to grip the surface of the work when the device is tightened with respect thereto, said corner portions and resilient section being cooperatively disposed to permit axial flexing of said resilient section after the locking means engages the work 5. A locking device including a plurality of oppositely disposed body sections of spring stock, a marginal connection between said sections, each of said sections being provided with internal thread follower means disposed in substantial coaxial alignment, and peripheral locking means associated with at least one of said resilient sections for gripping the surface of the work when the device is tightened with respect thereto, said locking means and the resilient section directly associated therewith being cooperatively disposed to permit axial flexing of said resilient section after said locking means grippingly engages the work.

6. A locking device including a plurality of oppositely disposed body sections of spring stock, a marginal connection between said sections, each of said sections being provided with internal thread follower means disposed in substantial coaxial alignment, and peripheral locking corners associated with at least one of said resilient sections for gripping the surface of the work when the device is tightened with respect thereto, said locking corners and the resilient section directly associated therewith being cooperatively disposed to permit axial flexing of said resilient section after said locking corners grippingly engage the work.

7. A locking device including a plurality of oppositely disposed body sections of spring stock, a marginal connection between said sections, each of said sections being provided with internal thread follower means disposed in substantial coaxial alignment, and peripheral locking means associated with said resilient sections for gripping the surface of the work when the device is tightened with respect thereto, said locking means and the resilient section directly associated therewith being cooperatively disposed to permit axial flexing of said resilient section after said locking means grippingly engages the work, said locking means projecting axially of said device so as to permit either side thereof to be applied to a threaded shank.

8. A locking device including a plurality of oppositely disposed body sections of spring stock having side surfaces conforming in contour with the side surfaces of a conventional nut, a marginal connection between said sections, each of said sections being provided with internal thread follower means disposed in substantial coaxial alignment, and peripheral locking means associated with at least one of said resilient sections for gripping the surface of the work when the device is tightened with respect thereto, said locking means and the resilient section directly associated therewith being cooperatively disposed to permit axial flexing of said resilient section after said locking means grippingly engages the work.

CARL G. OLSON.